United States Patent [19]

Johnson et al.

[11] 4,026,355
[45] May 31, 1977

[54] METHOD FOR TESTING AND MONITORING FOR PRODUCING LANDFILL GAS

[75] Inventors: Robert D. Johnson, Duncan, Okla.; Robert S. Altmann, Los Gatos, Calif.

[73] Assignees: NRG Nufuel Company, Phoenix, Ariz.; Reserve Synthetic Fuels, Inc., Newport Beach, Calif. ; a part interest to each

[22] Filed: June 30, 1975

[21] Appl. No.: 591,713

[52] U.S. Cl. .............................. 166/246; 48/197 A; 61/35; 166/250; 166/314
[51] Int. Cl.$^2$ ........................................ E21B 43/22
[58] Field of Search ............ 48/197 A, 209; 61/35; 73/155; 166/250, 314, 246

[56] References Cited

UNITED STATES PATENTS 3,732,697   5/1973   Dickson ................................. 61/35

OTHER PUBLICATIONS

Winston-Salem Dept. of Public Works, "Evaluation of Landfill Gas Migration's Prototype Gas Migration Barrier", 1975, pp. 49, 53, & 91.
"Sanitary Landfill: Alternative to the Open Dump", Environmental Science's Technology, vol. 6, No. 5, May, 1972, pp. 408–410.
Weiss, "Sanitary Landfill Technology", 1974, pp. 8 & 9.
"Los Angeles Sets Project for Landfill Gas Recovery", Solid Wastes Management, Jan. 1974, p. 64.

*Primary Examiner*—Ernest R. Purser
*Attorney, Agent, or Firm*—Gordon L. Peterson

[57] ABSTRACT

A method of withdrawing landfill gas from a landfill without drawing air into the landfill comprising providing a well in the landfill and withdrawing landfill gas from the well at a plurality of different withdrawal rates. The pressure at a selected region within the landfill is detected while the landfill gas is being withdrawn. A relationship is then established between the withdrawal rate and the pressure at the selected regions. This relationship is utilized to establish a maximum withdrawal rate, and this maximum rate occurs at approximately zero gauge pressure. Landfill gas is then withdrawn from the well at no more than about the maximum withdrawal rate.

21 Claims, 8 Drawing Figures

METHOD FOR TESTING AND MONITORING FOR PRODUCING LANDFILL GAS

BACKGROUND OF THE INVENTION

Decomposition of the refuse within a sanitary landfill produces landfill gas which contains methane. In some landfills the methane concentration is sufficient to warrant recovery of the landfill gas so that the methane can be utilized. In some instances, the methane is separated from the other constituents of the landfill gas by an adsorption process, and in other instances, the methane is used without removal of the impurity.

To recover the landfill gas, a well is sunk in the landfill. The chemical reaction within the landfill creates a pressure greater than atmospheric so that the landfill gas migrates into the well. However, to augment this natural flow, a pump can be used to reduce the pressure in the well below ambient.

From the standpoint of maximizing production of landfill gas, it would appear desirable to withdraw the landfill gas from the well at the maximum rate at which the pump is capable of operating. However, if this is done, air may be drawn into the landfill through the surface of the landfill. Air entry into the landfill is acceptable if the object of the well is simply to remove the methane to avoid the hazard presented by its combustible properties. However, if the purpose of the well is to recover the methane for use, air entry into the landfill is totally intolerable because the oxygen poisons the micro-organisms which are essential to the production of methane by the landfill. Accordingly, air entry must be avoided.

One attempt to avoid air entry involves withdrawing the landfill gas and making periodic analyses of its composition. If the gas has a predetermined oxygen content, the withdrawal rate is reduced in an effort to eliminate the oxygen in subsequently taken gas samples. The primary problem with this method is that it indicates air entry only after air has entered and flowed through portions of the landfill to the well. In other words, no indication of a problem is provided until the oxygen poisoning is well underway. There is also a lag between taking corrective action following oxygen detection and discontinuance of air entry into the landfill. For these reasons, the compositional analysis method is inadequate to avoid the oxygen poisoning problem.

Thus, a primary problem in recovering the methane from landfills is the selection of a withdrawal rate which is commercially feasible and which avoids oxygen poisoning. A related problem is determining the spacing between adjacent wells in the landfill. Proper well spacing is important to assure that all zones of the landfill are subjected to the influence of a well without causing air entry.

SUMMARY OF THE INVENTION

The present invention provides a landfill testing process for determining the maximum allowable withdrawal rate from a well without causing air entry into the landfill. This determination can be made in a testing phase which occurs before the well is used for production. In addition, proper well spacing can be determined in advance. Finally, as a safety measure, the present invention provides an early warning system for the detection of air entry into the landfill during production. Accordingly, if air entry should occur during production, an indication thereof is provided well before the oxygen flows through the landfill to the well.

When the landfill is not influenced by man made devices such as pumps, the landfill gas is at a static pressure. The static pressure is normally slightly greater than ambient pressure. Thus, under static conditions the pressure differential between the landfill and the atmosphere tends to cause the landfill gas to escape to the atmosphere. The present invention provides a testing program in which the maximum withdrawal rate is a function of the withdrawal rate when the pressure at a selected region in the landfill approximates ambient pressure. So long as the pressure within the landfill at the selected region does not drop below atmospheric pressure, there is no pressure differential which would cause air entry into the landfill.

The testing program of this invention provides a process for determining in advance of actual production the maximum withdrawal rate which will maintain the desired pressure relationship between a selected region of the landfill and the atmosphere. This can be accomplished, for example, by providing at least one well within the landfill and then withdrawing landfill gas from the well at first and second withdrawal rates during first and second periods, respectively. The pressure at a selected region within the landfill is detected during both the first and second periods. With this specific pressure and withdrawal rate information, a general relationship can be established between the pressure at the selected region and the withdrawal rate. This general relationship is utilized to establish the withdrawal rate which would produce approximately zero gauge pressure at the selected region. The withdrawal rate which would produce zero gauge pressure is the maximum allowable withdrawal rate for the well. In other words, the maximum withdrawal rate is the withdrawal rate which will produce a pressure at the selected region which is approximately equal to atmospheric pressure. If the withdrawal rate were to exceed the maximum withdrawal rate, the pressure at the selected region would drop below atmospheric pressure and the differential pressure across the surface of the landfill would tend to draw air into the landfill. However, by maintaining the pressure at the selected region at least equal to atmospheric pressure, there is no pressure differential which would tend to cause air entry into the landfill;

To obtain maximum methane production, the withdrawal rate should equal the maximum allowable withdrawal rate. The use of a withdrawal rate less than the maximum allowable rate provides a safety factor, but to the extent that a safety factor is provided, production of the landfill gas is reduced, The selected region at which the pressure is detected is preferably a region near the surface of the landfill. It is permissible for regions of the landfill spaced substantially from the landfill surface to be at pressures less than atomospheric so long as there is a layer or boundary at the top of the landfill which is at least at atmospheric pressure. In order to permit the lowest possible pressures to be used within the landfill, and hence obtain the maximum withdrawal rate, the selected region is preferably just beneath the cover material which is characteristically applied over the top of the refuse in the landfill. With this arrangement, the upper peripheral region of the refuse material in the landfill provides a pressure barrier which isolates the interior regions of the landfill from the atmosphere.

Horizontally, the selected region should be adjacent or relatively close to the well. The reason for this is that the zone of the landfill surface immediately adjacent the well is most likely to be at the lowest pressure. If the selected region were spaced horizontally a substantial distance from the well and were maintained at zero gauge pressure, a pressure less than atmospheric may exist just beneath the cover material closely adjacent the well in which event the pressure barrier would not exist over the full surface of the landfill.

In order to establish a relationship between withdrawal rate and pressure at the selected region, landfill gas is withdrawn at least at two different withdrawal rates. This permits a plot to be made of withdrawal rate versus pressure at the selected region to thereby establish a general relationship between withdrawal rate and pressure at the selected region. Although only two points are necessary to establish the line, it is preferred to use at least three different withdrawal rates. It is then a simple matter to use this general relationship to determine the withdrawal rate which exists at approximately zero gauge pressure at the selected region. This latter withdrawal rate becomes the maximum withdrawal rate for that well. This same maximum withdrawal rate can also be used for other wells in the landfill if it is assumed that the landfill is relatively homogeneous.

During the initial portion of a withdrawal period, the pressure at the selected region progressively decreases. Ultimately the pressure at the selected region stablizes. After pressure stability occurs, the withdrawal of landfill gas at a first withdrawal rate continues for a predetermined interval, and it is during this interval that the pressure at the selected region is monitored for purposes of establishing the relationship between withdrawal rate and pressure. The pressure can be monitored continuously or intermittently during this interval. However, it is preferred to average these pressures so that an average pressure for this predetermined interval is obtained.

At the end of the first period, the pump for withdrawing the landfill gas is shut down for a predetermined interval of sufficient duration to allow the pressure at the selected region to return to substantially static pressure. During this interval the pressure at the selected region is appropriately monitored, and the time required to reach static pressure is noted because this provides useful information as to the rate at which the landfill gas is generated. Thereafter, the procedure described above is repeated for a second withdrawal rate.

The selected region may be the same or a different region for each of the different withdrawal rates. In addition, the selected region may include a plurality of different zones at which pressure readings are taken. For example, the zones may be at different depths in the landfill. By taking pressure readings at different depths in the landfill, the accuracy of the pressure data taken can be checked.

The pressure at the selected region can be determined by installing a probe in the landfill at the desired region. To avoid any leakage between probes, it is preferred to use a separate excavation for each of the probes.

To further provide analytical data regarding the landfill, it is often desirable to provide a second well in the landfill spaced from the first well. The probes are then installed in a desired pattern and at the desired depths intermediate the two wells. The steps described above for determining the maximum allowable withdrawal rate may be performed to determine such rate for the second well.

A second phase of the testing operation is determining the well spacing for a given production rate. To accomplish this, the pressure in the landfill at horizontally spaced regions is determined during the first and second withdrawal periods. The regions at which pressure readings are taken for the purposes of determining well spacing are preferably immediately below the cover material of the landfill. The detected pressures during the first period are then utilized to establish the location closest to the well at which static pressure exists during the first period. The pressures detected during the second period are similarly utilized to determine the location closest to the well at which static pressure exists during the second period. These locations and withdrawal rates are then utilized to establish a relationship between the shortest distance from the well at which static pressure exists and withdrawal rate. For accuracy, it is preferred to have at least three of such points. The resulting curve provides an indication of the zone of influence of the well for a given production and rate. The zone of influence and well spacing can be determined for the maximum allowable withdrawal rate.

If the two wells have mutually exclusive zones of influence or if the two wells are to be operated nonsimultaneously, then each well can be operated at up to its maximum allowable withdrawal rate. However, if the wells are to be operated simultaneously and have overlapping zones of influence, an appropriate adjustment can be made. For example an empirical adjustment can be made which reduces the maximum allowable withdrawal rate for a given well spacing.

After testing, the landfill is used for production. As a safety measure, it may be desirable to monitor the pressure at a selected region within the landfill during production. Such pressure monitoring can be continuous or intermittent. If the pressure at the selected region drops below ambient, the withdrawal rate can be reduced, i.e. the pressure in the well can be increased to prevent the pressure at the selected region from building up to re-establish the pressure boundary. If this system is used, the magnitude of pressure in the well can be controlled in accordance with the pressure at the selected region. The selected region for pressure measurement is preferably the same as, or similar to, the region selected for determining the maximum allowable withdrawal rate.

DESCRIPTION OF THE PREFERRED EMBODIMENTS

Figure 1:
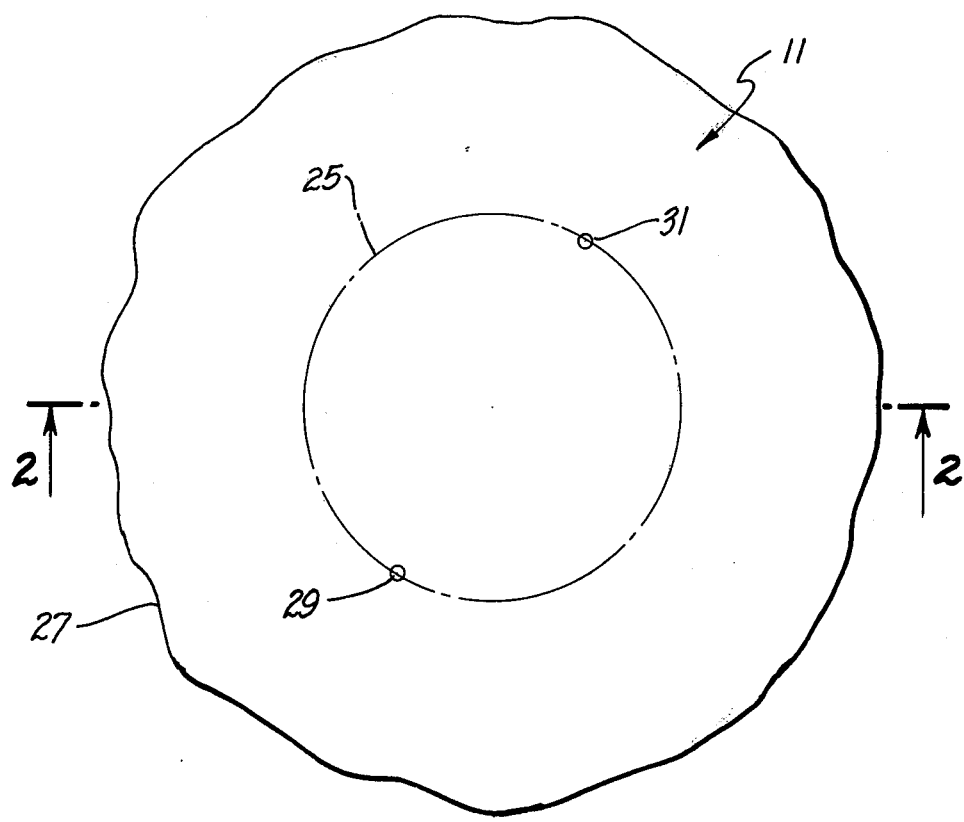
FIG. 1 is a top plan view of a sanitary landfill of the type from which landfill gas including methane can be extracted.
Figure 2:
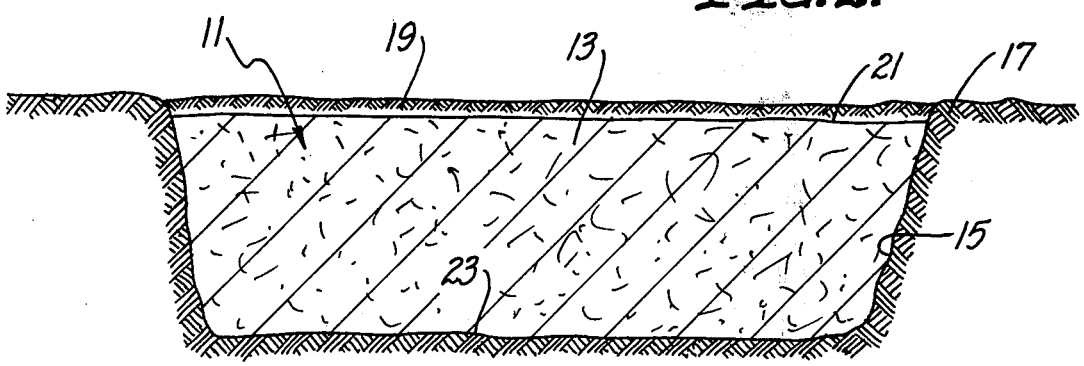
FIG. 2 is a fragmentary sectional view taken generally along line 2—2 of FIG. 1.

FIGS. 1 and 2 show a sanitary landfill 11 of the type in which anaerobic decomposition produces a landfill gas which includes methane. The landfill 11 has been formed in the usual manner by depositing refuse 13 in a cavity 15 in the earth 17. The landfill 11 also includes a layer of cover material 19, such as dirt, deposited on top of the upper surface 21 of the refuse 13. Although the refuse 13 appears homogeneous in FIG. 2, it should be understood that it is ordinarily not homogeneous, and it may contain several intermediate cover layers of dirt intermediate the upper surface 21 and the bottom 23 of the landfill 11. The testing program of this invention is applicable to the cavity type landfill 11 as well as other types of landfills such as the anticlinal landfill.

Assuming that it has been established that the landfill 11 contains a sufficient quantity of methane to make its withdrawal commercially feasible, then a testing program is carried out on the landfill in order to determine various factors such as the maximum allowable withdrawal rate and the spacing between production wells. The first step in the testing program is to locate a test area 25. The test area 25 is preferably in the form of a circle and is spaced inwardly from the periphery 27 of the landfill 11. For example, the test area 25 may have a 500-foot diameter and be located a minimum of 250 feet from the periphery 27. If the landfill 11 is too small to provide for these dimensions, the diameter of the test area 25 and the clearance between the test area of the periphery 27 can be proportionately reduced. For example, the diameter of the test area 25 might be reduced to 400 feet and the clearance would then be correspondingly reduced to 200 feet. Of course, other dimensions may be utilized, and the dimensions given above are merely illustrative of dimensions which have been found satisfactory.

Production wells 29 and 31 are then drilled in the landfill 11 at diametrically opposed locations on the perimeter on the test area 25. Thus, the wells 29 and 31 are spaced apart 500 feet in the specific embodiment described. The wells 29 and 31 may be identical, and it is assumed for purposes of describing this particular embodiment that the wells are identical.

Figure 3:
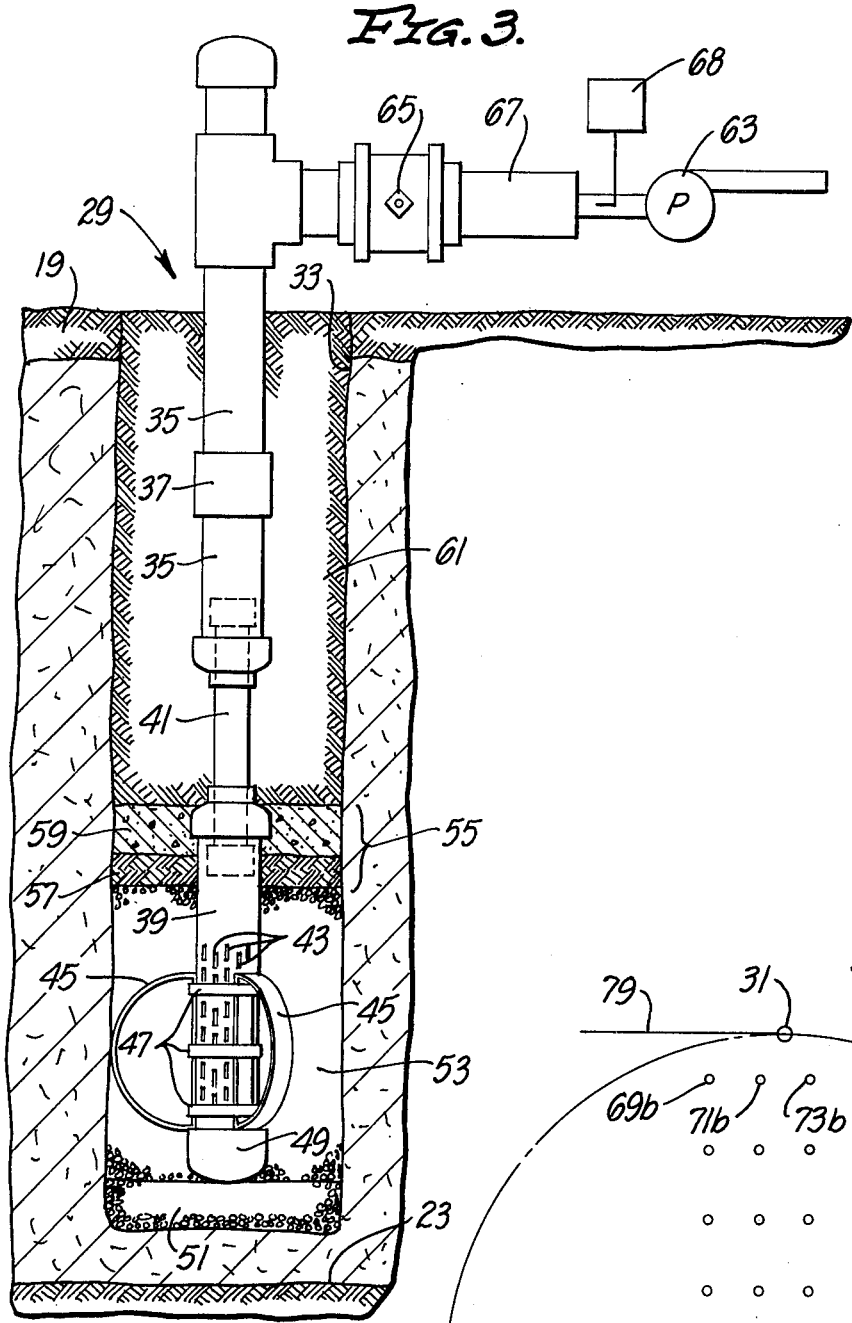
FIG. 3 is a sectional view illustrating a preferred form of well.

FIG. 3 shows by way of example one construction for each of the wells 29 and 31. Because the wells 29 and 31 are identical, only the well 29 is shown in FIG. 3.

The well 29 includes a bore 33 which may have a diameter of 24 to 36 inches. The bore 33 preferably extends almost to the bottom 23 of the landfill. A suitable number of pipe sections 35 interconnected by couplings 37 are provided within the bore 33. The lowermost of the pipe sections 35 is coupled to a perforated pipe section 39 by a slip joint 41 which allows relative axial movement between the perforated pipe section 39 and the lowermost pipe section 35. The slip joint 41 may be of conventional design. The perforated pipe section 39 has a series of perforations 43, and it is centered in the bore 33 by centralizers 45 which are mounted on the perforated pipe section 39 in any suitable manner such as by clamps 47. The bottom of the perforated pipe section 39 is closed by a cap 49 which rests on a layer of gravel 51 at the bottom of the bore 33. The pipe sections 35 and 39 may be, for example, constructed of a suitable plastic material such as polyvinyl chloride.

The bore 33 is packed with gravel 53 for most of the length of the perforated pipe section 39. A seal 55 is provided adjacent the upper end of the perforated pipe section 39 to seal the perforations 43 from the upper regions of the bore 33. In the embodiment illustrated, the seal 55 includes a layer of dirt 57 and a layer of concrete 59. Virgin soil backfill 61 is provided in the bore 33 above the seal 55. The uppermost of the pipe sections 35 is coupled to a pump 63 through a butterfly valve 65 and a pipe 67. A suitable flow indicating device 68, which may include a pitot tube is coupled to the pipe 67 between the valve 65 and the pump 63.

Figure 4:
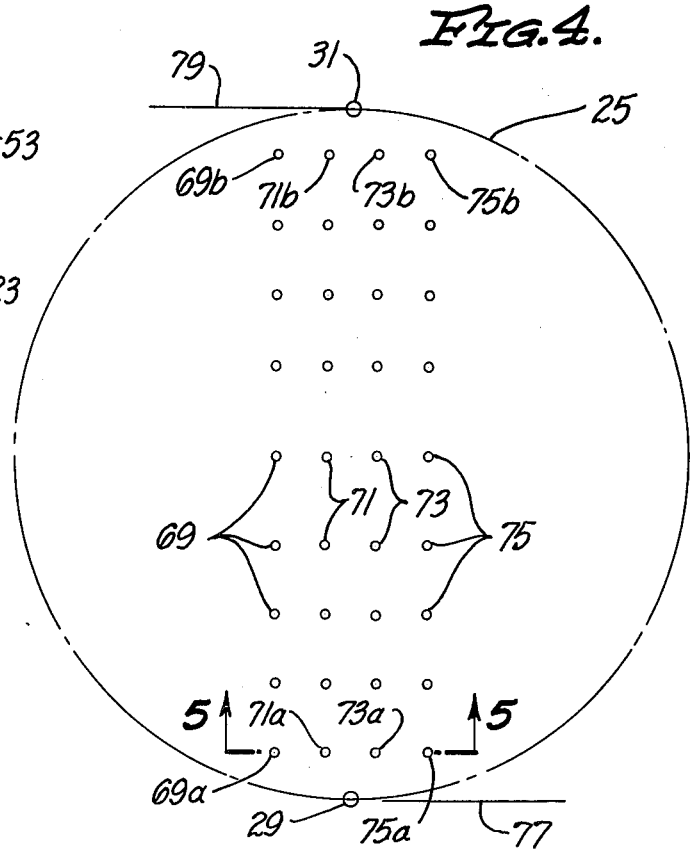
FIG. 4 is a top plan view of a preferred probe layout.

Four rows 69, 71, 73, and 75 of probes (FIG. 4) are installed between the wells 29 and 31. The number and depth of the probes and the probe pattern can all be widely varied depending upon the results desired. In the embodiment illustrated, the rows 69, 71, 73, and 75 of probes are equally spaced and may be spaced, for example, approximately 10 feet apart. Probes 69a, 71a, 73a, and 75a of the rows 69, 71, 73, and 75, respectively, are closest to the well 29 and constitute a series arranged in a transversely extending line. Similarly, the remaining probes of the four rows of probes are arranged in transversely extending lines. In the embodiment illustrated the series of probes 69a, 71a, 73a, and 75a are spaced 10 feet from a reference line 77 which extends through the well 29 tangent to the perimeter of the test area 25. By way of example, the next four series of probes may be spaced from the reference line 77 distances of 25, 50, 100, and 250 feet, respectively. These distances are not critical, but merely illustrative of one suitable probe layout.

Similarly, probes 69b, 71b, 73b and 75b are closest to the well 31. The distances between a reference line 79 drawn tangent to the perimeter of the test area 25 at the well 31 and the five series of probes closest to the well 31 may be identical to that described above with the well 29.

Figure 5:
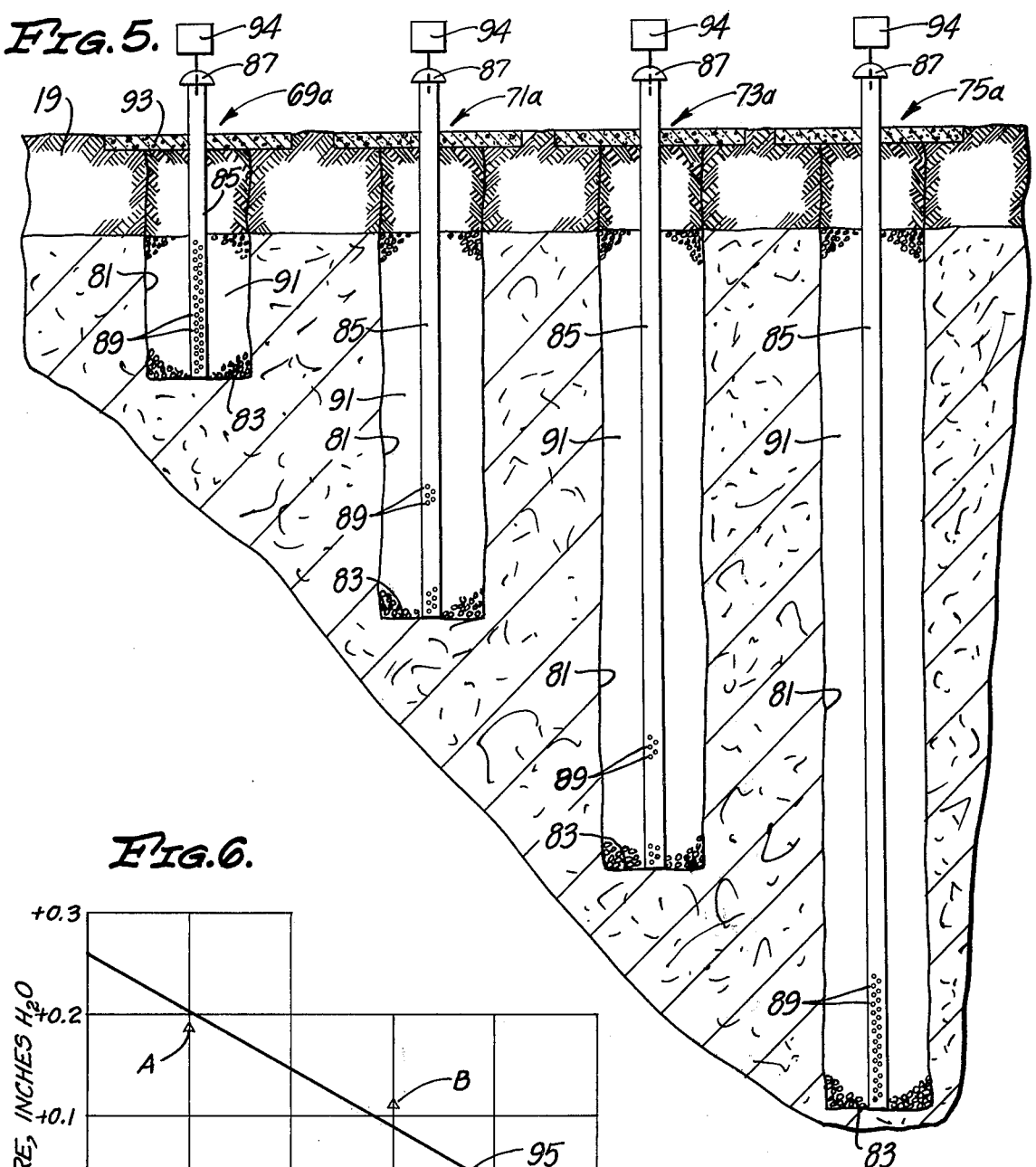
FIG. 5 is a sectional view taken generally along line 5—5 of FIG. 4 and illustrating a preferred probe arrangement.

The probes are preferably installed at different depths in the landfill. As shown in FIG. 5, the probes 69a–75a are installed at progressively increasing depths. Although various arrangements are possible, the cross section shown in FIG. 5 may be assumed to be typical of the embodiment illustrated, i.e. all probes of the row 69 are at the same depth, all probes of the row 71 are at the same depth, etc. Except for length, each of the probes may be identical, and accordingly only the probe 69a is described in detail, and corresponding reference numerals are utilized to designate corresponding parts.

The probe 69a is placed in a bore 81 which extends through the cover material 19. The bore 81 has a bottom 83 which, for example, may lie two feet below the cover material 19. The probe 69a includes a pipe 85 having a cap 87 on its upper end. The pipe 85 extends above and cover material 19 to the bottom 83. The region of the pipe 85 below the cover material 19 contains a large number of perforations 89. Preferably the portion of the pipe 85 which has the perforations 89 is relatively short, e.g. 2 feet long, in order to isolate the vertical location at which pressure readings are to be taken. A porous material such as gravel 91 fills the region of the bore 81 around the pipe 85 below the cover material 19. The top of the bore 81 is sealed off by a plate 93 which may be in the form of a concrete grout seal. The pipe 85 may be small diameter pipe constructed of a suitable plastic material such as polyvinyl chloride.

The probe 69a is a cover probe because it communicates with the region of the landfill 11 immediately beneath the cover material 19. A pressure indicator 94 which may be a manometer type device communicates with the interior of the pipe 85 and provides an indication of the gauge pressure of the landfill gas just beneath the cover material 19 contiguous the probe 69a. Gauge pressure is the pressure relative to existing barometric pressure and not relative to standard atmospheric pressure.

The probe 71a is longer than the probe 69a. For example, the probe 71a may extend to a depth equal to 20% of the depth of the well 29. The probes 73a and 75a may extend to depths equal to 50 and 75%, respectively, of the depth of the well 29. Each of the probes is installed in its own bore 81 and the length of the pipe 85 which has the perforations 89 may be identical for each of the probes.

The wells 29 and 31 and the probes may be installed in any desired sequence. With the wells and probes installed, static pressures are detected by the indicators 94 in all the probes and in the wells 29 and 31. These pressures can be detected continuously or intermittently for a sufficient period to accurately determine the static pressure for the wells 29 and 31 and for each of the probes. For example, pressure readings may be taken at the indicators 94 at 4-hour intervals for 24 hours. In addition to detecting the pressure, the temperature within the probes and the wells may also be taken as well as ambient pressure and temperature readings.

Next, three withdrawal rates are empirically selected. For example, the withdrawal rates may be 100 cubic feet per minute (cfm), 300 cfm, and 500 cmf. The pump 63 for the well 29 is started and operated at a speed to withdraw landfill gas from the well 29 at 100 cfm. The pump for the well 31 is shut down during the entire test of the well 29. Pumping of the well 29 progressively reduces the pressure in the probes. Ultimately, the pressures in the probes stablize, i.e. the pressure does not fluctuate significantly as the withdrawal of landfill gas continues. Landfill gas is withdrawn at the 100 cfm rate for an interval after pressure stabilization in the probes occurs. The pressures in all of the probes as reflected by the indicators 94 are monitored either continuously or intermittently both before and after pressure stabilization occurs. The speed of the pump is manually adjusted as necessary to maintain the desired flow rate.

Of particular importance is the pressure in the cover probe 69a after pressure stabilization occurs. After pressure stabilization occurs, an average stable pressure is determined for the cover probe 69a. This may be established, for example, by averaging the pressure readings taken after pressure stabilization occurs.

The pressure at the cover probe 69a is of particular importance because it is the location at which air entry would most likely first occur. The reason is that it is the closest of the cover probes to the perforations 43 of the well 29. For this reason, during operation of the well 29 and the pump 63, the cover probe 69a is more likely to be at a lower pressure than any of the other cover probes 69 because the other cover probes are displaced a greater distance for the perforations 43. However, if for any reason any of the other cover probes 69 are at a lower pressure than the cover probe 69a, then such other cover probe would be selected as the critical cover probe, and its average pressure would be determined and utilized as described herein below. However, if a cover probe has a lower pressure than the cover probe 69a, it may be the result of the landfill providing a relatively unrestricted channel to such probe. In some instances this channel can be destroyed to make the cover probe 69a have the lowest pressure of the cover probes 69.

After an average stable pressure has been determined for the critical cover probe (assumed herein to be the cover probe 69a) for the 100 cfm withdrawal rate, the pump 63 is shut down and the landfill 11 is allowed to return to the static pressure conditions determined before the pump 63 was first used. This may require, for example, a 48-hour period.

After the landfill 11 returns to static pressure conditions, the pump 63 is operated at the 300 cfm withdrawal rate, and the procedure described above is repeated. Thereafter the landfill 11 is again permitted to return to static pressure conditions, and then the pump is operated at the 500 cfm withdrawal rate, and the procedure discussed above is repeated.

Figure 6:
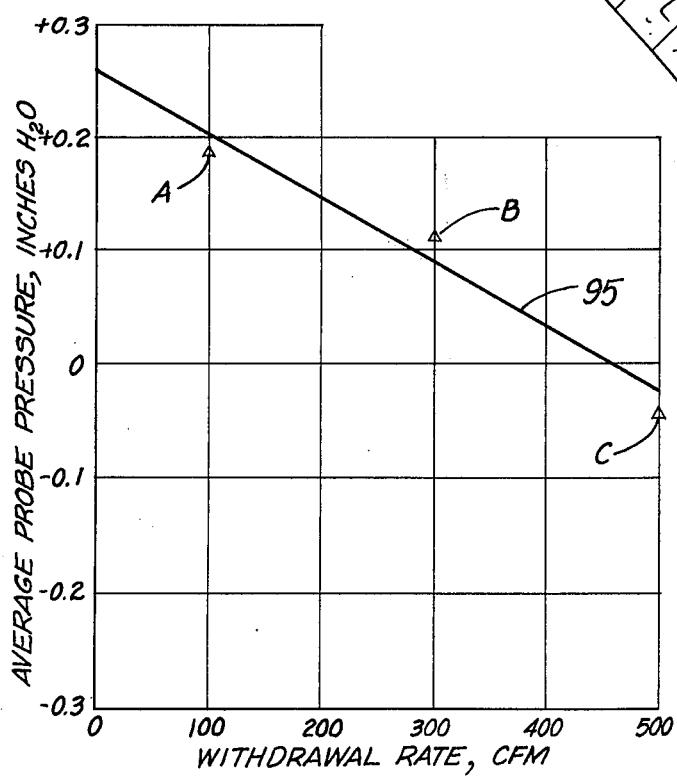
FIG. 6 is a plot of average probe pressure versus withdrawal rate.

Utilizing the data obtained, a plot as shown in FIG. 6 can be made. In FIG. 6, the points A, B, and C represent the average stable pressure in inches of water at the cover probe 69a for the withdrawal rates of 100 cfm, 300 cfm, and 500 cfm, respectively. The points A, B, and C serve to establish a relationship between pressure at the cover probe 69a and withdrawal rate. In FIG. 6, this relationship is represented by a line 95. This relationship is then utilized to establish the withdrawal rate at which pressure at the probe 69a would be zero gauge pressure, i.e. equal to atmospheric pressure. In the example shown in FIG. 6, the pressure at the probe 69a would be zero gauge at a withdrawal rate of approximately 460 cfm. 460 cfm for this example then becomes the maximum allowable withdrawal rate because higher withdrawal rates create a negative pressure at the cover probe 69a. This negative pressure, i.e. pressure less than atmospheric, creates a pressure differential tending to draw air into the landfill 11 whereas no such pressure differential exists at zero gauge pressure.

It should be noted that whether or not a pressure differential exists may be the result of changes in barometric pressure. However, because the landfill responds relatively slowly to small pressure differentials and because the selection of the maximum allowable withdrawal rate is based upon average pressures, it has been found that the selection of a maximum allowable withdrawal rate in this manner is most satisfactory.

In the specific embodiment described, the relationship between withdrawal rate and pressure at the probe 69a is expressed in the form of the line 95 on a graph. However, it should be understood that this relationship can be reasonably approximated without plotting it. Moreover, the withdrawal rate at which pressure at the probe 69a is approximately zero gauge could be established through trial and error methods or through a combination of trial and error and interpolation of trial and error results.

The average stable pressure at any of the other probes may also be plotted on the graph shown in FIG. 6, if desired. For example, it may be useful to plot the average stable pressures in probe 71a in FIG. 6. This may be useful if one of the points A, B or C in FIG. 6 is erratic. The deeper probes 73 and 75 are useful in determining zone of influence of the well 29 for different withdrawal rates.

Figure 7:
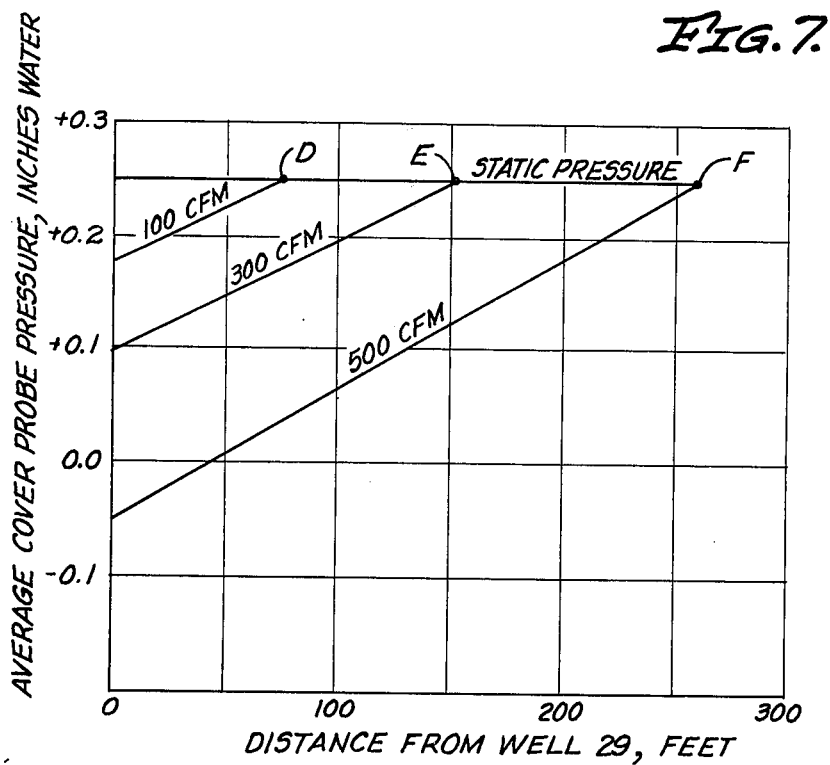
FIG. 7 is a plot of average cover probe pressure versus distance from the well for various withdrawal rates.

To obtain an indication of the zone of influence and to initiate a determination as to well spacing, the plot of FIG. 7 can be made. FIG. 7 shows average cover probe pressure, i.e. at the probes 69 versus distance from the well for the three selected withdrawal rates. In addition, FIG. 7 shows the static pressure at the cover probes 69 at various distances from the well 29, i.e. the reference line 77. The three cfm curves intersect the static pressure line at points D, E and F, respectively.

Figure 8:
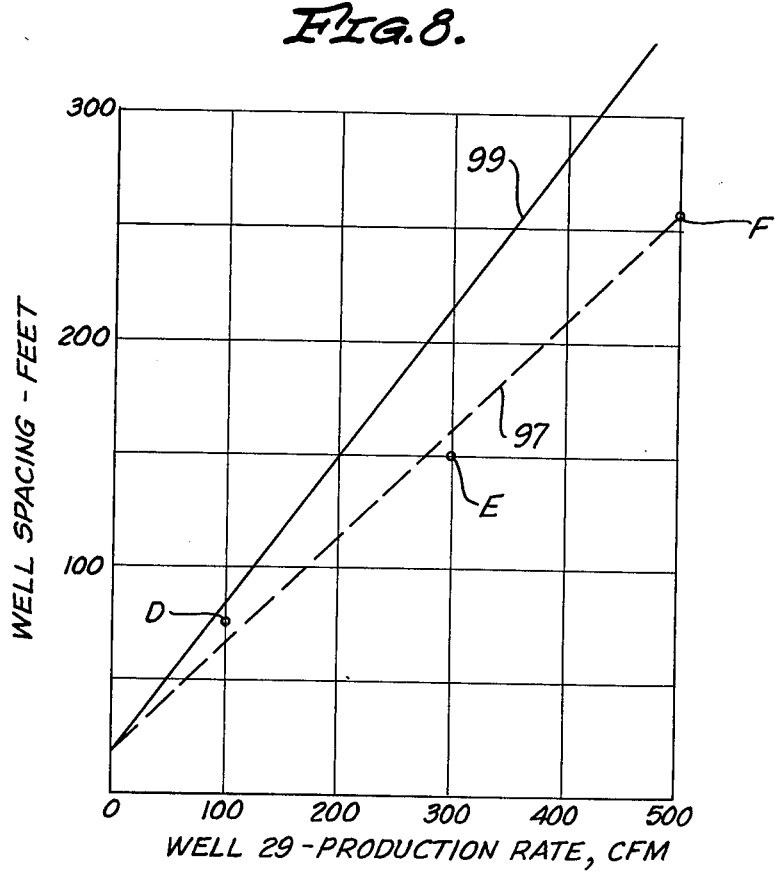
FIG. 8 is a plot of well spacing versus production rate for both single well and dual well production.

FIG. 8 is a plot of well spacing versus withdrawal rate. The points D, E and F from FIG. 7 are plotted in FIG. 8 as shown to establish a relationship in the form of a line 97 between well spacing and withdrawal rate.

If the wells 29 and 31 are to be operated simultaneously and if their zones of influence overlap, then the maximum allowable withdrawal rate for a given well spacing should be reduced to compensate for the effects of interaction between the adjacent wells. This may be accomplished by utilizing the relationship shown by the line 99 in FIG. 8. Specifically, the withdrawal rate for simultaneous dual well operation has been reduced 25%, and this is represented by the line 99 in FIG. 8. The 25% reduction factor is illustrative of a reduction which is believed to be satisfactory. Utilizing the line 99 for the maximum allowable rate of 460 cfm, the wells should be spaced apart at least approximately 315 feet. If desired, the test procedure described above for the well 29 could be repeated for the well 31 while the pump 63 for the well 29 is shut down. This would result in the plots of FIGS. 6–8 being made for the well 31. In this event, the more conservative figures for the two wells, for well spacing and maximum allowable withdrawal rate could be used for the wells 29 and 31 and for any other wells drilled in the landfill 11.

After the testing program is completed, the wells 29 and 31 are used for production of landfill gas. In addition, other wells may be drilled within the landfill 11. It is reasonable to assume that the results of the test, i.e. maximum allowable withdrawal rates and well spacing for the wells 29 and 31 are applicable to other wells in the landfill 11.

Wells operated at production rates established in accordance with this invention should have no problem with air entry into the landfill 11 through the cover material 19. However, the present invention provides an early warning system for air entry. This is accomplished by monitoring the pressure in the cover probes 68 adjacent one or more operating wells. For example, the pressure in the cover probes 69 and particularly in the cover probe 69a can be monitored during production with the well 29. If the pressure at any of the cover probes 69 drops below zero gauge pressure for a predetermined period of time or by a predetermined amount, the withdrawal rate can be correspondingly reduced to eliminate the pressure differential across the cover material 19 which may tend to force air into the landfill. Of course, slight negative pressures in the cover probes 69 or negative pressures in the cover probes 69 which exist for only a short period of time would not result in air entry because of the slow response of the air and the landfill 11 to pressure differentials of this kind. The speed of the pump 63 can be controlled manually or automatically in response to pressure conditions in the cover probe 69 which would warrant a change in the withdrawal rate. For example, pump speed should be reduced in response to the pressure in the cover probe 69a dropping a predetermined amount below ambient, such as 0.25 in $H_2O$ or dropping below ambient for a period of 48 hours.

Although exemplary embodiments of this invention have been shown and described, many changes, modifications, and substitutions may be made by those with ordinary skill in the art without necessarily departing from the spirit and scope of this invention.

We claim:

1. A method of producing landfill gas from a landfill without drawing air into the landfill in such quantities as to destroy the methane making ability of the landfill, said method comprising:
   providing at least one well in the landfill;
   withdrawing landfill gas through the well by maintaining the pressure within the well at a first pressure which is sufficiently low so that landfill gas from the landfill flows into the well;
   monitoring the pressure at least at one selected region within the landfill, said region being outside of said one well; and
   controlling the magnitude of the first pressure in accordance with the pressure at said region to substantially prevent drawing air into the landfill.

2. A method as defined in claim 1, wherein said region includes a region adjacent the well.

3. A method as defined in claim 1 wherein the landfill includes a layer of cover material and said method includes inserting a cover probe into the landfill adjacent said well, said region including the region of the landfill contiguous the probe and adjacent the cover material.

4. A method as defined in claim 3 wherein said step of controlling includes controlling the first pressure so that the pressure at said probe does not drop below atmospheric pressure.

5. A method as defined in claim 1 wherein said step of controlling includes increasing said first pressure in response to the pressure at said region dropping a predetermined amount below atmospheric pressure.

6. A method of producing landfill gas from a landfill without drawing air into the landfill wherein the landfill has a layer of cover material, said method comprising:
   providing at least one well in the landfill;
   withdrawing landfill gas from the well at a plurality of withdrawal rates while detecting the pressure within the landfill at a region adjacent the well and the cover material to determine the withdrawal rate at which the pressure within such region is approximately equal to atmospheric pressure, said region being outside of said well; and
   thereafter withdrawing landfill gas from said well at a withdrawal rate no greater than about said determined withdrawal rate whereby the methane making ability of the landfill is not destroyed by oxygen from the atmosphere.

7. A method of producing landfill gas from a landfill without drawing air into the landfill in such quantities as to poison the elements of the landfill which are essential to the making of methane by the landfill, said method comprising:
   providing at least one well in the landfill;
   withdrawing landfill gas from the well at a first withdrawal rate during a first period;
   detecting the pressure at least at a first region within the landfill during said first period;

withdrawing landfill gas from the well at a second withdrawal rate during a second period;

detecting the pressure at least at a second region within the landfill during said second period, said first and second regions being outside of said one well;

establishing a relationship between the withdrawal rate and the pressure at said region;

utilizing said relationship to establish a third withdrawal rate at approximately zero gauge pressure; and withdrawing landfill gas from a location in said landfill during a production period at no more than about said third withdrawal rate whereby the likelihood of air entry into the landfill is minimized.

8. A method as defined in claim 7 wherein said step of detecting the pressure during the first period includes monitoring the pressure at said first region during said first period to obtain an average pressure at said first region for a portion of said first period.

9. A method as defined in claim 8 wherein the withdrawal of landfill gas during said first period causes the pressure at said first region to progressively reduce to a relatively stable value, said portion of said first period occurring after said relatively stable value has been reached.

10. A method as defined in claim 7 wherein said well is at said location.

11. A method as defined in claim 7 wherein said first and second regions are the same.

12. A method as defined in claim 7 wherein at least one of said regions is adjacent said well, said method includes providing a probe at said first region and the step of detecting the pressure at said first region includes monitoring the pressure within said probe.

13. A method as defined in claim 7 including monitoring the pressure at a region adjacent said location during at least a portion of said production period and controlling the withdrawal rate from said well in accordance with the pressure at said region adjacent said location during said production period to substantially prevent drawing air into the landfill during said production period.

14. A method as defined in claim 7 wherein the pressure at said second region is reduced during said first period and said method includes providing an interval between said first and second periods with said interval being of sufficient duration to allow the pressure at said second region to return to substantially static pressure.

15. A method as defined in claim 7 wherein said well is at said location, said first region and said second region are the same and are located adjacent said well, said method including inserting a probe into the landfill at said first region, each of said steps of detecting including monitoring the pressure within said probe to obtain a first average pressure for a portion of said first period and a second average pressure for a portion of said second period.

16. A method of producing landfill gas from a landfill without drawing air into the landfill in sufficient quantities to destroy the methane making ability of the landfill, said method comprising:

providing at least one well in the landfill;

detecting the static pressure in the landfill at a plurality of distance from the well;

withdrawing landfill gas from the well at first and second withdrawal rates during first and second periods, respectively;

detecting the pressure at a plurality of regions in the landfill during said first and second periods with at least two of said regions being spaced different distances from said well, utilizing the pressures detected during a portion of said first period at said regions to establish for the first withdrawal rate approximately the shortest distance from the well at which static pressure exists during said portion of the first period;

utilizing the pressure detected during a portion of the second period at said regions to establish for the second withdrawal rate approximately the shortest distance from the well at which static pressure exists during said portion of the second period;

establishing a relationship between said shortest distances and withdrawal rates whereby well spacing for various flow rates can be determined;

providing at least one other well in said landfill;

establishing the maximum allowable withdrawal rate for said wells which can be used without drawing air into the landfill; and withdrawing landfill gas from the wells at a withdrawal rate which is no more than about the lesser of the withdrawal rate established by said relationship and said maximum allowable withdrawal rate.

17. A method of producing landfill gas from a landfill without drawing air into the landfill in quantities sufficient to poison the methane making ability of the landfill, said method comprising:

providing a first well in the landfill;

providing a plurality of probes arranged in a pattern in the landfill;

withdrawing landfill gas from said first well during a first phase;

detecting the pressure in at least a first group of said probes during said first phase;

establishing a maximum allowable withdrawal rate for said first well utilizing said pressures, said maximum allowable withdrawal rate being substantially the maximum rate at which landfill gas can be withdrawn without drawing air into the landfill; and withdrawing landfill gas from said first well at a rate which is no greater than said maximum withdrawal rate.

18. A method as defined in claim 17 wherein at least one of said probes extends more deeply into the landfill than said first group of probes, said method including detecting a characteristic of the gas in said one probe.

19. A method as defined in claim 17 wherein said step of providing a plurality of probes includes providing said first group of said probes at a first depth within the landfill and providing second and third groups of probes, said second group of probes being in said landfill at a greater depth than said first group of probes and said third group of probes being in said landfill at a greater depth than said second group of probes, said method including measuring a characteristic of the landfill gas in said second and third groups of probes.

20. A method of establishing a production rate at which landfill gas can be removed from a landfill without drawing air from the atmosphere into the landfill in such quantities as to destroy the methane making ability of the landfill, said method comprising:

providing at least one well in the landfill;

withdrawing landfill gas from the well at a first withdrawal rate during a first period;

detecting the pressure at least at a first region within the landfill during said first period;

withdrawing landfill gas from the well at a second withdrawal rate during a second period;

detecting the pressure at least at a second region within the landfill during said second period, said first and second regions being outside of said one well;

establishing a relationship between the withdrawal rate and the pressure at said region; and establishing said production rate as the withdrawal rate which, according to said relationship, would exist at approximately zero gauge pressure.

21. A method as defined in claim 20 wherein the landfill includes a cover material and said method includes inserting a cover probe into the landfill adjacent said well, and said first-mentioned step of detecting includes detecting the pressure at said cover probe.

* * * * *